E. D. MYERS.
ARTIFICIAL BAIT.
APPLICATION FILED JULY 31, 1914.
1,140,279.
Patented May 18, 1915.
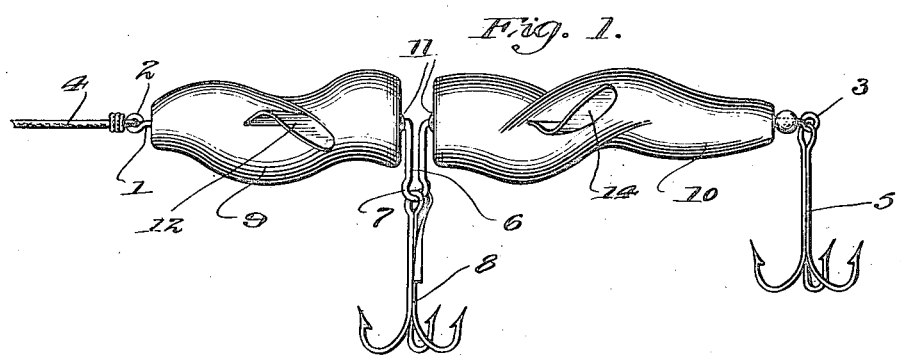
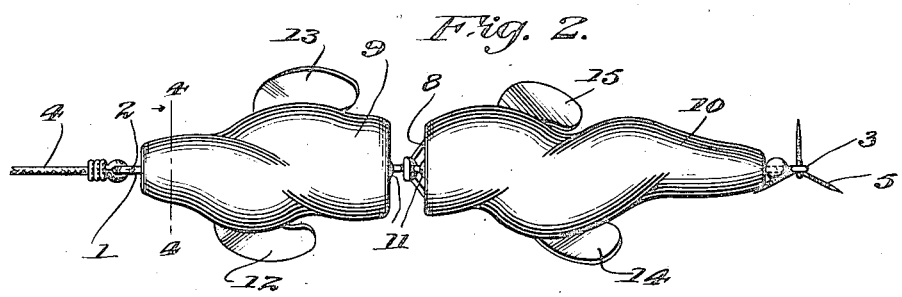
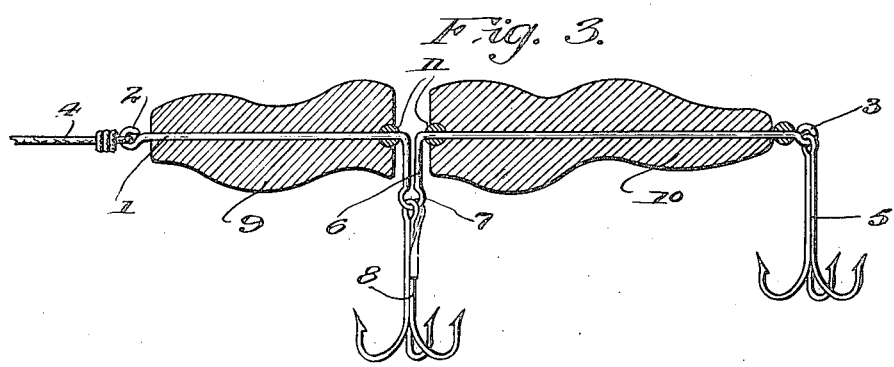
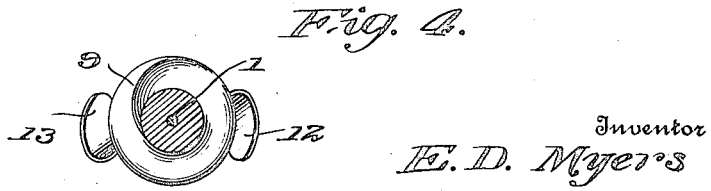
Inventor
E. D. Myers
Witnesses
Frederick R. Moran
A. C. Hines
By Victor J. Evans
Attorney

UNITED STATES PATENT OFFICE.

EDWARD D. MYERS, OF SHELBY, MICHIGAN.

ARTIFICIAL BAIT.

1,140,279.　　　　　Specification of Letters Patent.　　Patented May 18, 1915.

Application filed July 31, 1914. Serial No. 854,334.

*To all whom it may concern:*

Be it known that I, EDWARD D. MYERS, a citizen of the United States, residing at Shelby, in the county of Oceana and State of Michigan, have invented new and useful Improvements in Artificial Bait, of which the following is a specification.

This invention relates to improvements in artificial bait, and its object is to provide a bait composed of a pair of body sections adapted to revolve in opposite directions as the bait is drawn through the water, whereby a life-like motion of the bait is obtained.

A further object of the invention is to provide an artificial bait which has a spiral or screw like motion as it travels through the water, by which the action of self-propulsion is closely simulated, and the bait made attractive to the fish.

The invention consists of the features of construction, combination and arrangement of parts herein fully described and claimed, reference being had to the accompanying drawing in which:—

Figure 1 is a side elevation of an artificial bait embodying my invention. Fig. 2 is a top plan view of the same. Fig. 3 is a vertical longitudinal section. Fig. 4 is a vertical transverse section on line 4—4 of Fig. 2.

Referring to Fig. 1 of the drawing, 1 designates a rod or stem terminating at its front and rear ends in eyes 2 and 3, for the attachment, respectively of the line 4, and one or more rear hooks 5. The intermediate portion of the stem is bent or offset to provide a right angularly extending arm or looped portion 6 formed to provide an eye 7, to which may be attached one or more hooks 8.

The bait body is composed of a pair of transversely divided sections 9 and 10, made of wood, metal or other material, and painted or striped in any suitable manner to represent the desired kind of living bait. These sections are revolubly mounted on the stem in front and rear of the arms 6, suitable bearing members 11 being provided on the stem to serve as stops, whereby excess endwise motion of either bait section is prevented.

The bait sections may simulate the body of an eel or other bait, and are of serpentine or spiral formation or may be round and striped spirally, so that upon being revolved they will have an auger like motion or effect in going through the water, in an irregular path simulating the swimming motion of the bait. Said sections are each provided at their opposite sides with propelling blades or vanes, the blades or vanes upon the front section being designated 12 and 13, respectively, and the blades or vanes upon the rear section being designated 14 and 15 respectively. As shown, these blades or vanes are spirally curved and project downwardly and inwardly or upwardly and rearwardly, the vane 12 at one side of the section 10 being bent upwardly and rearwardly and the vane 13 at the opposite side thereof is bent downwardly and rearwardly, while the vanes 14 and 15 are similarly bent with respect to each other, that is at like angles, but reversely to the blades 12 and 13 of the section 9. These blades or vanes are set at such an angle as to revolve the bait sections faster than the natural course of the spirals through the water, thus giving the effect of self-propulsion. The construction is therefore such that when the bait is drawn through the water the section 9 will be revolved in one direction and the section 10 in the opposite direction, the bait thereby taking a zigzag course of travel in a lateral direction, while revolving in an auger-like manner upon itself. As a result, a life-motion of the bait is produced, rendering it very attractive to certain kinds of fish.

If desired, the space between the adjacent ends of the body sections 9 and 10 may be closed by a sleeve or shield, but this is not essential.

I claim:—

An artificial bait comprising a rod or stem having front and rear eyes and an intermediate arm terminating in an eye, the front eye being adapted for the attachment of a line, hooks engaging the other eyes, and a bait body composed of a pair of serpentine shaped sections revolubly mounted upon the rod in front and rear of said arm, said sections having blades for evolving the same in opposite directions.

In testimony whereof I affix my signature in presence of two witnesses.

EDWARD D. MYERS.

Witnesses:
　C. E. ELLIS,
　J. C. WADE.